United States Patent [19]

Wanner

[11] Patent Number: 4,752,165
[45] Date of Patent: Jun. 21, 1988

[54] ARRANGEMENT FOR TORQUE TRANSMITTING, AND TOOL COOPERATING THEREWITH

[75] Inventor: Karl Wanner, Leinfelden-Echterdingen, Fed. Rep. of Germany

[73] Assignee: Robert Bosch GmbH, Stuttgart, Fed. Rep. of Germany

[21] Appl. No.: 674,836

[22] Filed: Nov. 26, 1984

[30] Foreign Application Priority Data

Dec. 9, 1983 [DE] Fed. Rep. of Germany ....... 3344552

[51] Int. Cl.⁴ .............................................. B25D 17/08
[52] U.S. Cl. ................. 408/239 R; 279/19.4; 279/60; 408/226
[58] Field of Search ............. 408/226, 240, 239 R, 408/239 A; 279/19.5, 123, 155, 19.6, 19.7, 60, 19, 19.1, 19.2, 19.3, 19.4

[56] References Cited

U.S. PATENT DOCUMENTS

| 1,794,511 | 3/1931 | Bush | 279/123 |
|---|---|---|---|
| 2,512,149 | 6/1950 | Gartin | 279/19.5 |
| 2,543,117 | 2/1951 | Mackmann | 279/123 X |
| 2,690,915 | 10/1954 | Pegler | 279/123 X |
| 3,136,347 | 6/1964 | Linquist | 408/226 |
| 3,459,433 | 8/1969 | Hohwart | 279/123 |
| 3,589,826 | 6/1971 | Finn | 408/226 |
| 3,637,225 | 1/1972 | Schmuck | 279/81 |
| 4,006,787 | 2/1977 | Rumpp | 279/155 X |
| 4,202,557 | 5/1980 | Haussman et al. | 279/19.5 |
| 4,284,284 | 8/1981 | Sides | 279/19.5 |
| 4,491,445 | 1/1985 | Hunger et al. | 279/60 X |
| 4,512,692 | 4/1985 | Nielsen | 408/226 |
| 4,536,109 | 8/1985 | Hunger et al. | 408/240 |
| 4,565,472 | 1/1986 | Brennsteiner et al. | 279/19 X |
| 4,619,460 | 10/1986 | Rohm | 279/19 |
| 4,623,155 | 11/1986 | Rohm | 279/19 |

FOREIGN PATENT DOCUMENTS

| 64735 | 11/1982 | European Pat. Off. | 279/123 |
|---|---|---|---|
| 7227714 | 7/1972 | Fed. Rep. of Germany | 279/62 |
| 8132988 | 9/1982 | Fed. Rep. of Germany | 408/226 |
| 8327665 | 12/1983 | Fed. Rep. of Germany | 279/116 |
| 283139 | 9/1952 | Switzerland | 408/226 |
| 574789 | 4/1976 | Switzerland | 279/19 |
| 2030485 | 4/1980 | United Kingdom | 279/60 |
| 2103988 | 3/1983 | United Kingdom | 279/19.5 |

Primary Examiner—Z. R. Bilinsky
Attorney, Agent, or Firm—Michael J. Striker

[57] ABSTRACT

An arrangement for torque transmitting to impacting and/or drilling tool has a chuck provided with clamping jaws which in the region of their contact with a tool shaft have a toothing including a plurality of teeth which extend parallel to an axis of the chuck and engage with a toothed portion of the shaft end.

18 Claims, 1 Drawing Sheet

ARRANGEMENT FOR TORQUE TRANSMITTING, AND TOOL COOPERATING THEREWITH

BACKGROUND OF THE INVENTION

The present invention relates to an arrangement for torque transmitting to impacting and/or drilling tool as well as to an impacting and/or drilling tool cooperating with the arrangement.

With the utilization of tools having a smooth tool shaft an allowable torque transmission depends on the strength of the radial clamping of the tool shaft by jaws of a chuck. It has been proposed to provide in a smooth tool shaft recesses which are closed in an axial direction and in which the jaws of a chuck engage in a torque-transmitting manner. The driving of the tool is performed in this case by form-locking engagement of the chuck jaws into the recesses of the tool shaft and thereby is not dependent on the degree of the radial clamping by the jaws. In addition to the high manufacturing costs for such tool shafts, it also possesses the significant disadvantage in that this method of driving is suitable only for tools whose shaft has a predetermined minimum diameter. For small shaft diameters this method is not suitable since it is not possible to provide the openings which are closed in an axial direction in a thin shaft.

SUMMARY OF THE INVENTION

Accordingly, it is an object of the present invention to provide an arrangement for transmitting torque and a tool cooperating therewith, which avoid the disadvantages of the prior art.

More particularly, it is an object of the present invention to provide an arrangement for torque transmitting and a tool cooperating therewith which is price favorable in manufacture and suitable for tool shafts of all diameters to an equal extent.

In keeping with these objects and with others which will become apparent hereinafter, one feature of the present invention resides, briefly stated, in an arrangement for torque transmitting and/or a chuck and/or a tool in which clamping of of a tool shaft is performed by clamping jaws which have in their region arranged to contact with the tool shaft a toothing with teeth extending axially and engaging with a toothed portion of the tool shaft.

When the cross-section of the tool shaft and the clamping jaws is formed in accordance with the present invention, the respective tool without taking special measures with respect to its angular position is inserted into the chuck and clamped there. The form-locking engagement of the clamping jaws with the toothed portion of the tool shaft provides for an absolutely reliable driving which is not dependent on pressure force of the clamping jaws. This makes the inventive proposal especially suitable for such applications in which in addition to a reliable torque transmission to the tool, an axial relative displacability must be allowed, such for example in the case of dowel drills in hammer drills. It is important here that the impact energy which takes place on the shaft end of the drill be conducted through the drill shaft to the drill tip with as a good a resistance as possible, without absorbing by the clamping in the drill chuck.

In accordance with another advantageous feature of the present invention, the tool shaft has at its free end a teeth-free flange which cooperates with a shoulder of the clamping jaws formed for example between the teeth of the clamping jaws and their remaining portions. Thereby the axial movability of the tool is limited so that the tool cannot fall out or be withdrawn from the chuck, or the axial movability can be maintained within predetermined limits.

It is especially advantageous when the toothed portion of the tool shaft is designed for each shaft diameter so that its number of teeth is dividable by three. Thereby in the case of the utilization of a chuck with three clamping jaws, a radially symmetrical locking or clamping of the shaft is guaranteed and the tool runs absolutely round.

For the purpose of cost-economical manufacture of the chuck in accordance with the present invention, the clamping jaws can be provided with hard alloy inserts each having a toothing extending parallel to the axis of the chuck. In this manner it is possible to use expensive hard alloy (hard metal) which requires special steps for its treatment only at such locations and only in such quantity where their properties are effectively needed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
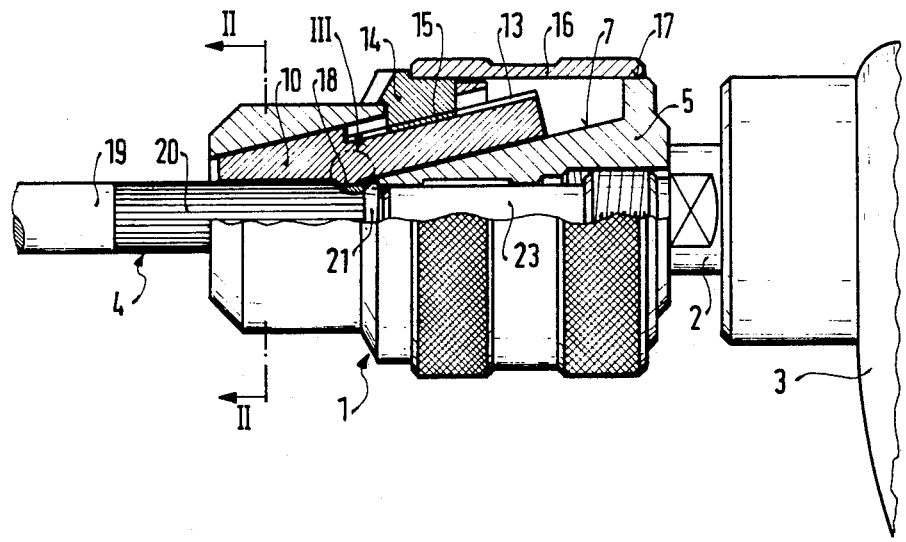
FIG. 1 is a view showing an arrangement for transmitting torque with a chuck and a tool clamp therein, in accordance with the present invention, partially in section.
Figure 2:
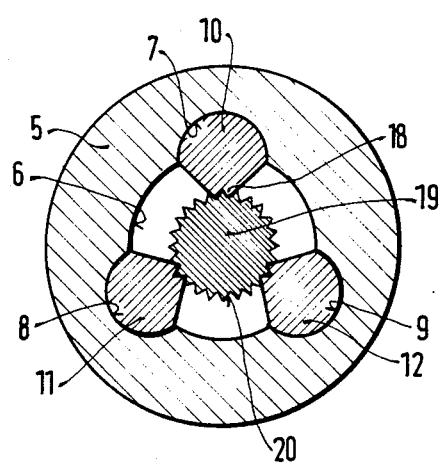
FIG. 2 is a view showing a section taken along the line II—II in FIG. 1.

An arrangement for transmitting torque is shown in FIG. 1 as a chuck 1 which is mounted in a known manner on a tool holder receiving element 2 of a hammer drill 3. The tool holder receiving element 2 transmits the rotary movement from the hammer drill to the chuck 1 and thereby to a tool clamped in the tool holder, for example a dowel drill 4. The mechanical construction of the chuck 1 is not an inventive feature of the present invention. Decisive is, however, the design of those regions of the clamping jaws of the chuck 1 in which they come into contact with the shaft of the tool inserted in the chuck. It should be mentioned that this specific design of the clamping jaws in the above-mentioned regions is completely independent from the construction of the chuck. Moreover, the specific design of the clamping jaws can find its application in any of chuck known in many different forms. Therefore, the chuck 1 is shown more or less schematically.

The chuck body is identified with reference numeral 5 and is provided with a central receiving opening 6 and three guiding openings 7, 8 and 9 which extend in a wedge-like manner to the central opening 6 and are spaced from one another in a circumferential direction by equal angular distances of respectively 120°. The chuck has clamping jaws 10, 11, 12 each displaceably held and supported in a respective one of the guiding openings 7, 8, 9. Each clamping jaw 10, 11, 12 extends into the central opening 6 with its radial end which faces toward the central opening 6. The clamping jaws 10, 11, 12 have an outer surface which is provided in a conventional manner with a thread identified with reference numeral 13 on the clamping jaw 10 in FIG. 1.

The chuck is further provided with a ring 14 which surrounds all three clamping jaws 10, 11, 12 from outside. For manufacturing grounds, the ring 14 can be formed for example of two semi-circular ring segments. The ring carries a conical thread 15 which engages with the thread 13 of the clamping jaw 10 and the threads of other clamping jaws 11 and 12. Therefore, a rotation of the ring 14 without axial displacement leads to screwing-in or screwing-out of the three clamping jaws 10, 11, 12.

The ring 14 is fixedly connected with a clamping sleeve 16. The connection is performed, for example, by press fit. The clamping sleeve 16 is held rotatable by the fixed connection with the rotatable ring 14, but axially non-displaceable on an outer peripheral surface 17 of the chuck body 5.

Each clamping jaw 10, 11, 12 is provided with a toothing 18 in the region in which the clamping jaw is in contact with the shaft of a tool inserted in the chuck. The toothing 18 has teeth which extend parallel to the axis of the chuck 1.

In the shown example, each clamping jaw 10, 11, 12 has two axially extending teeth with a roof-ridge-shaped cross section. It is to be understood that each clamping jaw can have only one tooth or more than two teeth.

The dowel drill 4 inserted in the chuck 1 has on its shaft 19 a longitudinal knurled portion 20 which extends over a part of the entire length of the shaft 19. The individual teeth of the knurled portion 20 have a roof-ridge-shaped cross-section and the shape of their cross-section corresponds to the shape of the cross-section of the toothing 18 of the clamping jaws of the chuck 1. The number of teeth of the knurled portion 20 is divisible by the number 3, whereby it is guaranteed that the toothing 18 of each of the three clamping jaws 10, 11, 12 can engage in the toothing formed by the longitudinal knurled portion 20 of the shaft 19, without coming the teeth over one another.

Figure 3:
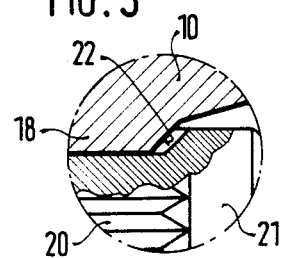
FIG. 3 is a view showing a fragment III taken from FIG. 1 on an enlarged scale.

The shaft 19 of the drill 4 is provided at its free end with a not-knurled flange 21. The teeth of the toothing 18 of the clamping jaws 10, 11, 12 form in turn a shoulder 22. The flange 21 together with the shoulder 22 form an abutment which prevents falling-out of the drill from the chuck and limits its axial displacement, as can be clearly seen in FIG. 3.

An anvil 23 is guided in the body 5 and driven in a known and therefore not shown manner by a striking mechanism of the hammer drill 3. It transmits the striking movements coming from the hammer drill 3 to a free end of the drill 4, the free end facing the hammer drill 3.

By the form-locking engagement of the toothing 18 of the clamping jaws 10, 11, 12, into the teeth of the knurled portion 20, a reliable rotary driving is guaranteed also when the radial clamping force of the clamping jaws 10, 11, 12 of the chuck is selected relatively weak. This provides for the advantage that the strike energy applied by the anvil 23 to the free end of the drill shaft 19 is transmitted unobjectionably through the drill shaft 19 to the drill tip, since the relatively weak clamping force allows an axial movement of the drill 4 relative to the chuck 1 which serves as a tool receptacle, so that it, and thereby also the hammer drill 3 do not participate in the striking movements.

Figure 4:
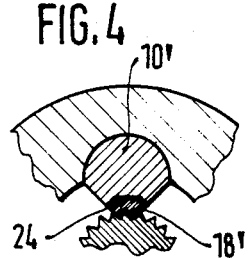
FIG. 4 is a view showing a section taken along the line II—II in FIG. 2 through one clamping jaw of the chuck, formed in accordance with another embodiment of the present invention.

The clamping jaws 10, 11, 12 of the chuck 1 are advantageously composed of hard alloy to allow increase of the strong loading of the operation and to guarantee a high service life. The clamping jaws can also be formed as shown in FIG. 4. Here, a claping jaw 10' is shown which in the region of the toothing 18 has a hard alloy insert 24 which is connected with the clamping jaw 10' for example by hard soldering.

It will be understood that each of the elements described above, or two or more together, may also find a useful application in other types of constructions differing from the types described above.

While the invention has been illustrated and described as embodied in an arrangement for transmitting torque to impacting and/or drilling tool it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for transmitting torque to an impacting and/or drilling tool having a tool shaft comprising a chuck serving as an impact and/or torque transmitting receptacle for said tool, said chuck defining a center axis and including a plurality of clamping jaws adjustable for clamping tool shafts of different diameters; each clamping jaw having a region for engaging said tool shaft, said regions being formed with elongated toothing extending parallel to said center axis; said tool shaft being formed with a plurality of elongated teeth extending parallel to a center axis of said tool and engaging said toothing on said jaw regions, said tool shaft having a free end provided with a teeth-free flange, each of said clamping jaws being provided with a shoulder which cooperates with said flange of said tool shaft so as to limit an axial displacement of the tool during an impacting and/or drilling operation thereof.

2. An arrangement as defined in claim 1, wherein said shoulder of said clamping jaws is formed between said toothing and the remaining portion of each of said clamping jaws.

3. An arrangement as defined in claim 1, wherein said toothing of each of said clamping jaws has a predetermined length, said teeth of said tool shaft having a length which is significantly greater than the length of said toothing of each of said clamping jaws by an amount which is greater than the amount required for a form-locking engagement of said toothing of said clamping jaws with said teeth of said tool shaft.

4. An arrangement as defined in claim 1, wherein said toothing of each of said clamping jaws includes a plurality of teeth each having a substantially roof-ridge-shaped cross-section.

5. An arrangement as defined in claim 1, wherein said clamping jaws are composed of hard alloy.

6. An arrangement as defined in claim 1, wherein said clamping jaws of said chuck are provided with hard alloy inserts having said toothing.

7. A chuck for receiving impacting and/or drilling tools having a tool shaft with a plurality of elongated teeth, the chuck comprising a body having an axis; and a plurality of clamping jaws movable in said body in the direction of said axis and each having a region arranged to contact with the tool shaft, each region being provided with an elongated toothing having a plurality of teeth which extend parallel to said axis of said body and being formed to cooperate with the teeth of said tool shaft in a torque-transmitting manner; said tool shaft having a tooth-free flange at its free end; and each of said clamping jaws having a shoulder arranged to cooperate with the flange of the tool shaft so as to prevent axial movement of the tool in direction of withdrawal of the tool from the chuck.

8. A chuck as defined in claim 7, wherein said shoulder is formed between said toothing and a remaining portion of each of said clamping jaws.

9. A chuck as defined in claim 7, wherein said toothing of each of said clamping jaws has a length which is smaller than the length of the teeth of the tool shaft by an amount which is greater than the amount required for a form-locking engagement of said toothing of said clamping jaws with the teeth of the tool shaft.

10. A chuck as defined in claim 7, wherein said teeth of each of said clamping jaws have a substantially roof-ridge-shaped cross-section.

11. A chuck as defined in claim 8, wherein said clamping jaws are composed of hard alloy.

12. A chuck as defined in claim 8, wherein said clamping jaws are provided with hard allow inserts having said toothing.

13. An impacting and/or rotary tool to be clamped in a chuck having an axis and a plurality of axially movable clamping jaws each with a region provided with a shoulder and with an elongated toothing having a plurality of teeth extending parallel to said axis and being spaced one from the other in a direction which is transverse to said axis, the tool comprising a tool shaft having a toothed portion with a plurality of elongated teeth arranged to cooperate with the elongated teeth of the toothing of the clamping jaws in a torque-transmitting manner; said tool shaft having a free end provided with a teeth-free flange arranged to cooperate with the shoulders of the clamping jaws so as to prevent withdrawal of said tool shaft from the chuck.

14. A tool as defined in claim 13, wherein said toothed portion of said tool shaft has a length exceeding the length of the toothing of the clamping jaws by an amount which is greater than the amount required for a form-locking engagement of the toothing of the clamping jaws with said toothed portion of said tool shaft.

15. A tool as defined in claim 13, wherein said toothed portion of said tool shaft has a plurality of teeth whose number is dividable by the number 3.

16. A tool as defined in claim 13, wherein said tool shaft has a further teeth-free portion of a predetermined diameter, said toothed portion of said tool shaft having an outer diameter which is essentially equal to the diameter of said teeth-free portion of said tool shaft.

17. A tool as defined in claim 13, wherein said toothed portion of said tool shaft has a coarse toothing with a pitch of substantially 1–2 mm.

18. A tool as defined in claim 13, wherein said toothed portion of said tool shaft has a plurality of teeth having a substantially roof-ridge-shaped cross-section.

* * * * *